United States Patent
Matsuda

(10) Patent No.: US 7,035,768 B2
(45) Date of Patent: Apr. 25, 2006

(54) METHOD FOR COLLECTING REMOTE MAINTENANCE AND DIAGNOSTIC DATA FROM SUBJECT EQUIPMENT, OTHER DEVICE AND MANUFACTURING EXECUTION SYSTEM

(75) Inventor: Katsuhiko Matsuda, Fuchu (JP)

(73) Assignee: Tokyo Electron Limited, Tokyo (JP)

( * ) Notice: Subject to any disclaimer, the term of this patent is extended or adjusted under 35 U.S.C. 154(b) by 84 days.

(21) Appl. No.: 10/385,711

(22) Filed: Mar. 12, 2003

(65) Prior Publication Data

US 2003/0176989 A1   Sep. 18, 2003

(30) Foreign Application Priority Data

Mar. 12, 2002   (JP)   ............................ 2002-067093

(51) Int. Cl.
*G06F 19/00*   (2006.01)
(52) U.S. Cl. ..................... 702/184; 700/121; 340/500
(58) Field of Classification Search ................ 702/182, 702/183, 184, 185, 188, 84; 700/121, 108, 700/109, 110; 340/500, 540, 635, 3.1, 3.43
See application file for complete search history.

(56) References Cited

U.S. PATENT DOCUMENTS

| | | | | |
|---|---|---|---|---|
| 5,355,083 A | * | 10/1994 | George et al. | 324/229 |
| 5,541,510 A | * | 7/1996 | Danielson | 324/233 |
| 6,594,621 B1 | * | 7/2003 | Meeker | 702/185 |
| 6,604,061 B1 | * | 8/2003 | Takahashi et al. | 702/188 |
| 6,618,692 B1 | * | 9/2003 | Takahashi et al. | 702/188 |
| 6,656,119 B1 | * | 12/2003 | Sasaki et al. | 600/437 |
| 6,691,064 B1 | * | 2/2004 | Vroman | 702/183 |
| 6,745,096 B1 | * | 6/2004 | Yamamoto et al. | 700/121 |
| 6,766,210 B1 | * | 7/2004 | Jun et al. | 700/110 |
| 6,772,096 B1 | * | 8/2004 | Murakami et al. | 702/184 |
| 6,795,798 B1 | * | 9/2004 | Eryurek et al. | 702/188 |
| 6,853,959 B1 | * | 2/2005 | Ikeda et al. | 702/188 |
| 2001/0056335 A1 | * | 12/2001 | Ikeda et al. | 702/188 |
| 2002/0013908 A1 | * | 1/2002 | Nishihata et al. | 713/201 |
| 2002/0035447 A1 | * | 3/2002 | Takahashi et al. | 702/188 |
| 2002/0049565 A1 | * | 4/2002 | Kirila et al. | 702/188 |
| 2002/0052715 A1 | * | 5/2002 | Maki | 702/184 |
| 2002/0095269 A1 | * | 7/2002 | Natalini et al. | 702/188 |
| 2002/0099520 A1 | * | 7/2002 | Falada et al. | 702/182 |
| 2002/0156542 A1 | * | 10/2002 | Nandi | 700/30 |
| 2002/0161555 A1 | * | 10/2002 | Deb et al. | 702/188 |
| 2002/0161940 A1 | * | 10/2002 | Eryurek et al. | 710/15 |
| 2002/0169514 A1 | * | 11/2002 | Eryurek et al. | 700/110 |
| 2002/0183978 A1 | * | 12/2002 | Koyama et al. | 702/188 |
| 2003/0004656 A1 | * | 1/2003 | Bjornson | 702/34 |
| 2003/0028268 A1 | * | 2/2003 | Eryurek et al. | 700/73 |
| 2003/0046382 A1 | * | 3/2003 | Nick | 709/224 |
| 2003/0195653 A1 | * | 10/2003 | Lewis et al. | 700/236 |
| 2004/0078946 A1 | * | 4/2004 | Nakamoto et al. | 29/25.01 |
| 2004/0093184 A1 | * | 5/2004 | Hendrickson | 702/184 |
| 2004/0176868 A1 | * | 9/2004 | Haga et al. | 700/121 |
| 2004/0255261 A1 | * | 12/2004 | Kanno | 717/100 |
| 2005/0021311 A1 | * | 1/2005 | Deb et al. | 702/188 |
| 2005/0108577 A1 | * | 5/2005 | Nishihata et al. | 713/201 |
| 2005/0131656 A1 | * | 6/2005 | Ikeda et al. | 702/188 |

\* cited by examiner

*Primary Examiner*—Patrick J. Assouad
(74) *Attorney, Agent, or Firm*—Crowell & Moring LLP

(57) ABSTRACT

Upon performing a remote maintenance/diagnosis of a manufacturing equipment, data deriving from the manufacturing equipment that is a subject of the remote maintenance/diagnosis, data deriving from a manufacture related equipment other than the manufacturing equipment, and data regarding a manufacturing execution are collected as data used for the remote maintenance/diagnosis. The data collected as the data used for the remote maintenance/diagnosis is transmitted to a remote center that performs the maintenance/diagnosis of the manufacturing equipment.

11 Claims, 2 Drawing Sheets

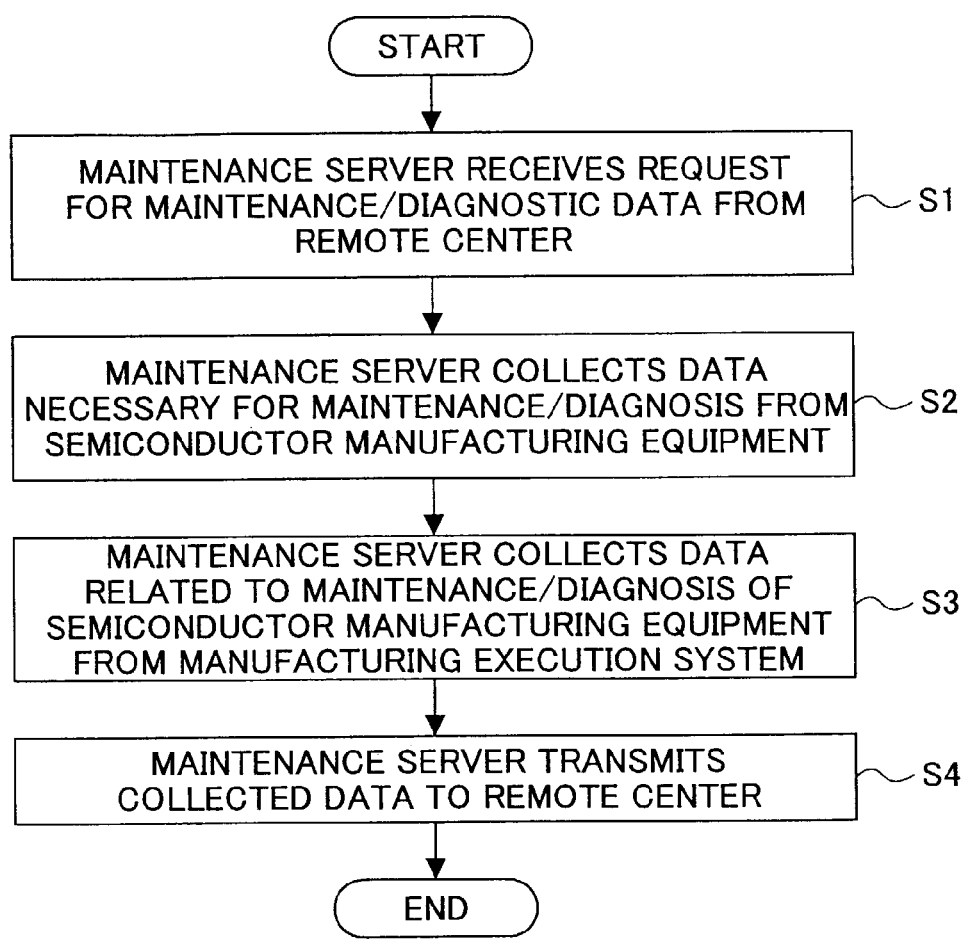

METHOD FOR COLLECTING REMOTE MAINTENANCE AND DIAGNOSTIC DATA FROM SUBJECT EQUIPMENT, OTHER DEVICE AND MANUFACTURING EXECUTION SYSTEM

BACKGROUND OF THE INVENTION

1. Field of the Invention

The present invention generally relates to a maintenance and diagnostic data collecting method and system, and more particularly, to a method and a system for collecting data used for a remote maintenance/diagnosis of a manufacturing equipment.

2. Description of the Related Art

Recently, for example, when a vender of a manufacturing equipment, such as a semiconductor manufacturing equipment or a liquid crystal manufacturing equipment, performs a remote maintenance/diagnosis of a manufacturing equipment of the vender which is operating at a customer's site, the vender collects data regarding the manufacturing equipment subjected to the maintenance/diagnosis (hereinafter simply referred to as subject equipment) from the subject equipment per se or from an intermediary device, such as a group controller, which keeps data sent from the subject equipment, to a remote maintenance center at the vender's site. The customer's site and the vender's site are connected via a communication network, such as a public circuit, a private circuit, or the Internet.

The remote maintenance center at the vender's site uses the data collected regarding the manufacturing equipment operating at the customer's site for the maintenance of the manufacturing equipment or for the diagnosis of the manufacturing equipment. Accordingly, when an abnormality occurs during a process of the subject equipment due to a malfunction of the subject equipment per se, a cause of the abnormality can be identified.

However, in reality, the cause of the abnormality occurring during the process of the subject equipment is not limited to the malfunction of the subject equipment per se. For example, a malfunction of a device other than the subject equipment in a preceding process or malfunctions of other devices, such as a measurement equipment and a testing equipment, may result in the abnormality occurring during the process of the subject equipment. In addition, an event occurring when the subject equipment is off-line may result in the abnormality occurring during the process of the subject equipment after the subject equipment is switched to online. In these cases, analyzing the data regarding the subject equipment collected at the remote maintenance center at the vender's site does not lead to the identification of the cause of the abnormality of the subject equipment.

In order to perform the remote maintenance/diagnosis of the subject equipment at the remote maintenance center even in the above-described cases, it is effective to use data deriving from a device other than the subject equipment, such as process result data resulting from a process of a testing equipment, and to use data regarding a manufacturing execution, such as work-in-process tracking information, for example.

SUMMARY OF THE INVENTION

It is a general object of the present invention to provide an improved and useful maintenance and diagnostic data collecting method and system in which the above-mentioned problems are eliminated.

A more specific object of the present invention is to provide a method and a system for collecting not only data deriving from a manufacturing equipment, but also data deriving from a device other than the manufacturing equipment and data regarding a manufacturing execution so as to use the data upon performing a remote maintenance/diagnosis of the manufacturing equipment.

In order to achieve the above-mentioned objects, there is provided according to one aspect of the present invention a method for collecting data used for a remote maintenance and diagnosis of a manufacturing equipment, the method including the step of collecting data deriving from the manufacturing equipment being a subject of the remote maintenance and diagnosis, data deriving from a manufacture related equipment other than the manufacturing equipment, and data regarding a manufacturing execution, and the step of transmitting the data collected in the step of collecting to a remote center performing the maintenance and diagnosis of the manufacturing equipment.

According to the present invention, upon subjecting a manufacturing equipment, such as a semiconductor manufacturing equipment or a liquid crystal manufacturing equipment, to a remote maintenance/diagnosis, data deriving from the subject equipment, data deriving from a device other than the subject equipment, and data regarding a manufacturing execution are collected as data necessary-for the maintenance/diagnosis of the manufacturing equipment, and are transmitted to a remote maintenance center performing the maintenance/diagnosis. Accordingly, upon performing the maintenance/diagnosis of the manufacturing equipment, the remote maintenance center is able to use data deriving from a device other than the subject equipment, such as process result data resulting from a process of a testing equipment, and data regarding a manufacturing execution, such as work-in-process tracking information.

Additionally, in the maintenance and diagnostic data collecting method according to the present invention, the data regarding the manufacturing execution may be data acquired from a manufacturing execution system performing a manufacturing execution in a manufacturing factory at a user's site. Thus, the data is used already for other usage. Therefore, the data regarding the manufacturing execution can be acquired without involving extra costs.

Additionally, in the maintenance and diagnostic data collecting method according to the present invention, the data deriving from the manufacturing equipment, the data deriving from the manufacture related equipment, and the data regarding the manufacturing execution may be collected and transmitted to the remote center in response to a request from the remote center. Thus, only data being necessary is communicated only when the data is necessary; accordingly, increase in communication load can be kept to a minimum.

Additionally, in the maintenance and diagnostic data collecting method according to the present invention, the data deriving from the manufacturing equipment may be collected by a data controlling device connected communicably to the manufacturing equipment and the remote center, and be transmitted to the remote center via the data controlling device. Accordingly, communications with the remote center situated outside the manufacturing factory can be concentrated on the data controlling device. Thus, each manufacturing equipment communicates with the data controlling device on an existing LAN inside the manufacturing factory without directly communicating with the remote center. Therefore, data used for the maintenance/diagnosis of the manufacturing equipment can be eventually collected to the user site without providing a new infrastructure.

Additionally, in the maintenance and diagnostic data collecting method according to the present invention, the data to be transmitted to the remote center may be collected by a data controlling device connected communicably to the remote center, upon receiving a request from the remote center, and be transmitted to the remote center from the data controlling device. Accordingly, all the data used for the maintenance/diagnosis of the manufacturing equipment can be collected to the data controlling device, and be transmitted to the remote center from the data controlling device. Thereby, an effective data collection and transmission can be realized.

In order to achieve the above-mentioned objects, there is provided according to one aspect of the present invention a system for collecting data used for a remote maintenance and diagnosis of a manufacturing equipment, the system including the manufacturing equipment situated at a user site, manufacture related equipments situated at the user site, a manufacturing execution system situated at the user site, a data collecting and transmitting part situated at the user site, and a remote center remotely maintaining and diagnosing the manufacturing equipment, wherein the remote center is connected communicably to the user site so as to make a request to the user site for data necessary for maintaining and diagnosing the manufacturing equipment, and to receive the necessary data collected at the user site from the user site, and the data collecting and transmitting part collects data deriving from the manufacturing equipment, data deriving from the manufacture related equipments, and manufacturing execution data acquired from the manufacturing execution system, and transmits the data deriving from the manufacturing equipment, the data deriving from the manufacture related equipments, and the manufacturing execution data to the remote center as the necessary data in response to the request from the remote center.

According to the present invention, not only the data deriving from the manufacturing equipment, but also the data deriving from the manufacture related equipments other than the manufacturing equipment and the manufacturing execution data, can be used as the data used for the remote maintenance/diagnosis of the manufacturing equipment. Accordingly, even when a trouble occurring in the manufacturing equipment originates from measurement instruments or equipments in a preceding process, a malfunctioning part can be identified. Additionally, since the data deriving from the manufacture related equipments other than the manufacturing equipment and the manufacturing execution data are data acquired and used already for other usages. Therefore, the data can be acquired without involving extra costs.

Additionally, in the maintenance and diagnostic data collecting system according to the present invention, the data collecting and transmitting part may be incorporated in a group controller corresponding to, or controlling, the manufacturing equipment. Accordingly, a data collection can be realized by using the existing group controller collectively controlling manufacturing equipments of a same type, without adding new hardware.

Other objects, features and advantages of the present invention will become more apparent from the following detailed description when read in conjunction with the accompanying drawings.

BRIEF DESCRIPTION OF THE DRAWINGS

FIG. 2 is a flowchart of a method performed by a maintenance server function according to the embodiment of the present invention for collecting the data used for the remote maintenance/diagnosis.

DETAILED DESCRIPTION OF THE PREFERRED EMBODIMENTS

Figure 1:
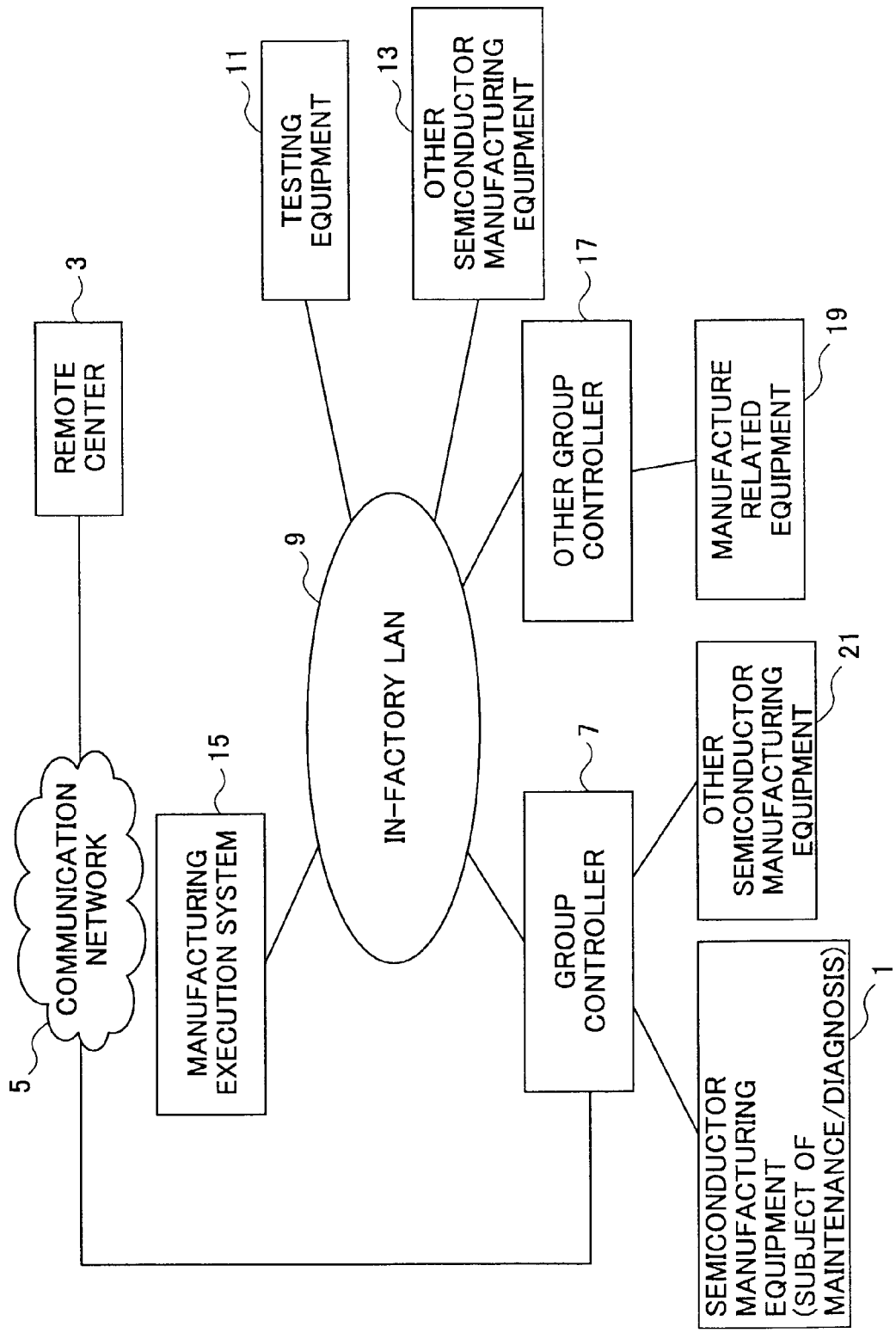
FIG. 1 is a diagram showing a configuration of a system for collecting data used for performing a remote maintenance/diagnosis of a semiconductor manufacturing equipment according to one embodiment of the present invention.

A description will now be given of an embodiment of the present invention.

FIG. 1 is a diagram showing a configuration of a system for collecting data used for performing a remote maintenance/diagnosis of a semiconductor manufacturing equipment according to one embodiment of the present invention.

In the system according to the present embodiment, a semiconductor manufacturing equipment 1 as a subject of a maintenance/diagnosis which is situated at a user's site (e.g., a semiconductor manufacturing factory) is maintained and diagnosed remotely by a remote center 3 at a vender's site. The semiconductor manufacturing equipment 1 is a device used in semiconductor manufacturing processes, such as a film deposition process, a diffusion process and an etching process. Besides, in a case shown in FIG. 1, the vender's site and the user's site are connected via a communication network 5, such as the Internet. However, a communication between the vender's site and the user's site is conducted not only by using such a network, but also by using other communication systems including a connection system using a public circuit or a connection system using a private circuit, which is capable of transmitting and receiving data between the vender's site and the user's site.

Various apparatuses are installed in the semiconductor manufacturing factory at the user's site: the apparatuses include a manufacturing execution system 15 performing a manufacturing execution in the manufacturing factory as a whole, group controllers (data controlling devices) 7 and 17 collectively controlling semiconductor manufacturing equipments of a same type or of a same vender, various testing equipments 11, and other semiconductor manufacturing equipments 13 and 21. These apparatuses are communicably connected via a network, such as an in-factory LAN 9, or via a bus. Besides, various manufacture related equipments 19, such as testing equipments and other semiconductor manufacturing equipments, are connected to the group controller 17. To simplify the case, FIG. 1 only shows the two group controllers 7 and 17, the one semiconductor manufacturing equipment 1 as the subject of the maintenance/diagnosis, the two other semiconductor manufacturing equipments 13 and 21, one of the manufacture related equipments 19, and one of the testing equipments 11. However, the present invention is applicable to a case including a larger number of these apparatuses.

The remote center 3 at the vender's site maintains and diagnoses the semiconductor manufacturing equipment 1 situated at the user's site, regularly or when necessary. The remote center 3 sends a request via the communication network 5 to the group controller 7 controlling the semiconductor manufacturing equipment 1 to transmit data used for the maintenance/diagnosis of the semiconductor manufacturing equipment 1.

Normally, the group controller 7 acquires and stores data deriving from the semiconductor manufacturing equipment 1; accordingly, upon receiving the request from the remote center 3, the group controller 7 may already have retained the data regarding the semiconductor manufacturing equipment 1. If the data regarding the semiconductor manufacturing equipment 1 is insufficient, the group controller 7 newly acquires data deriving from the semiconductor manufacturing equipment 1.

Next, since the group controller 7 controls only data of the same type, the data acquired from the semiconductor manufacturing equipment 1 by the group controller 7 may not be sufficient for the remote center 3 to maintain and diagnose the semiconductor manufacturing equipment 1 in some cases.

Such cases include a process trouble that results not only from the semiconductor manufacturing equipment 1 per se being troubled, but also from testing equipments (including measurement instruments) or devices in a preceding process. Therefore, in order to identify a malfunctioning part, it is preferable to use diagnostic information and process data deriving from other devices.

In general, diagnostic information and process data from numerous devices, data from measurement instruments, and so forth are collected in the manufacturing execution system 15. Accordingly, the group controller 7 collects from the manufacturing execution system 15 diagnostic information and process data deriving from other devices which are necessary for the maintenance/diagnosis of the semiconductor manufacturing equipment 1. Besides, the group controller 7 may collect diagnostic information and process data deriving from other devices by accessing the group controller 17, the testing equipments 11 or the semiconductor manufacturing equipment 13.

Further, aside from process result data deriving from the above-mentioned measurement instruments and other devices, the group controller 7 collects from the manufacturing execution system 15 varieties of data regarding the manufacturing execution, such as work-in-process (WIP) tracking information, process history, and current status of each process step (online/offline), as data effective for the maintenance/diagnosis of the semiconductor manufacturing equipment 1.

Next, the group controller 7 transmits the data used for the maintenance/diagnosis of the semiconductor manufacturing equipment 1 collected as above to the remote center 3 via the communication network 5.

The remote center 3 performs the maintenance/diagnosis of the semiconductor manufacturing equipment 1 by analyzing automatically, semiautomatically or manually the data used for the maintenance/diagnosis of the semiconductor manufacturing equipment 1 transmitted from the group controller 7.

As described above, the group controller 7 according to the present embodiment has a function of a maintenance server (a data collecting and transmitting part) collecting data used for a maintenance/diagnosis of a semiconductor manufacturing equipment, and transmitting the collected data to a remote server. Alternatively, such a maintenance server having the above-mentioned function may be provided separately from the group controller 7.

FIG. 2 is a flowchart of a method performed by the maintenance server or the maintenance server function of the group controller according to the embodiment of the present invention for collecting maintenance/diagnostic data used for a remote maintenance/diagnosis.

Step S1: The maintenance server receives a request for maintenance/diagnostic data from the remote center.

Step S2: The maintenance server collects data necessary for the maintenance/diagnosis from a semiconductor manufacturing equipment as a subject of the maintenance/diagnosis.

Step S3: The maintenance server collects data regarding other devices and data regarding a manufacturing execution which are related to the maintenance/diagnosis of the semiconductor manufacturing equipment from the manufacturing execution system.

Step S4: The maintenance server transmits the data collected in step S2 and step S3 to the remote center.

By the above-described steps, the remote center at a vender's site collects the data necessary for the maintenance/diagnosis of the semiconductor manufacturing equipment from a user's site.

Next, a description will be given of examples of applying the present invention to cases of identifying a cause of an abnormality occurring in a semiconductor manufacturing process.

(1) A case of identifying a cause of an abnormality by judging from an elapsed time from a preceding step:

Assuming that the process includes three steps of (a) preliminary washing, (b) diffusion (film deposition) and (c) film thickness testing (measurement): when an elapsed time from the end of (a) preliminary washing to the start of (b) diffusion is excessively long, a natural oxide film forms on a wafer, which may result in an abnormality found in the step of (c) film thickness testing. When the abnormality in film thickness is detected in the step of (c) film thickness testing, a diffusion device is suspected to be in abnormal condition; thus, a diagnosis of the diffusion device is started.

However, in this case, a cause of the occurrence of the abnormality cannot be identified only from conventional process history output from the diffusion device. By contrast, according to the present invention, process history (start/end time) of the preliminary washing is communicated to the manufacturing execution system; accordingly, the process history of the preliminary washing and the process history from the diffusion device are transmitted to the remote center, and are examined in combination at the remote center; thereby the cause of the abnormality can be identified.

(2) A case of identifying an abnormality resulting from an operation upon off-line status of a device:

When a semiconductor manufacturing equipment is off-line (or down), no data is communicated from the semiconductor manufacturing equipment to the group controller. Therefore, as to a process abnormality and so forth originating from an operation (e.g., cleaning, parts replacement, or other maintenance processes) performed to the semiconductor manufacturing equipment in an off-line status, it is difficult to identify a cause of the abnormality only from data communicated from the semiconductor manufacturing equipment in an online status to the group controller.

According to the present invention, operations, such as maintenance processes, performed according to an operator input and so forth to the semiconductor manufacturing equipment in the off-line status, is recorded in the manufacturing execution system as maintenance history. Accordingly, the maintenance history stored in the manufacturing execution system and the process history of the semiconductor manufacturing equipment communicated via the group controller are examined in combination at the remote center; thereby the cause of the abnormality can be identified.

The above-described maintenance and diagnostic data collecting method according to the embodiment of the present invention can be constructed as software (program code); and executing this program code by a CPU of a computer realizes the maintenance and diagnostic data collecting system according to the embodiment of the present invention. The constructed program code is recorded in a disk device and so forth, and is installed into the computer as occasion arises; the constructed program code is stored in a portable recording medium, such as a flexible disk, a memory card, or a CD-ROM, and is installed into the computer as occasion arises; or the constructed program code is installed into the computer via a communication line; then, the constructed program code is executed by the CPU of the computer.

The present invention is not limited to the specifically disclosed embodiments, and variations and modifications may be made without departing from the scope of the present invention.

The present application is based on Japanese priority application No. 2002-067093 filed on Mar. 12, 2002, the entire contents of which are hereby incorporated by reference.

What is claimed is:

1. A group controller which is connected communicably to a remote center and has a function of acquiring and storing data deriving from manufacturing equipments including a target manufacturing equipment which is to be subjected to a remote maintenance and diagnosis,
    wherein said group controller has a function of checking whether there is a shortage of data already acquired and stored, newly acquiring data, which have been already stored as history data in at least one of the manufacturing equipments, so as to make up the shortage, and then sending the data including said newly acquired data to the remote center, in response to reception of a request from the remote center for data required to perform the maintenance and diagnosis of the target manufacturing equipment.

2. The group controller claimed in claim 1, wherein data is newly acquired from the target manufacturing equipment.

3. The group controller claimed in claim 1, wherein data is newly acquired from the manufacturing equipment other than the target manufacturing equipment which is connected to said group controller.

4. The group controller claimed in claim 3, wherein the data newly acquired consists of diagnostic information and process data of the manufacturing equipment other than the target manufacturing equipment which is connected to said group controller.

5. A group controller which is connected communicably to a remote center and a manufacturing execution system, and has a function of acquiring and storing data deriving from manufacturing equipments including a target manufacturing equipment which is to be subjected to a remote maintenance and diagnosis,
    wherein said group controller has a function of checking whether there is a shortage of data already acquired and stored, newly acquiring data, which have been already stored as history data in at least one of the manufacturing equipments or the manufacturing execution system, so as to make up the shortage, and then sending the data including said newly acquired data to the remote center, in response to reception of a request from the remote center for data required to perform the maintenance and diagnosis of the target manufacturing equipment.

6. The group controller claimed in claim 5, wherein data is newly acquired from the target manufacturing equipment.

7. The group controller claimed in claim 5, wherein data is newly acquired from the manufacturing equipment other than the target manufacturing equipment which is connected to said group controller.

8. The group controller claimed in claim 7, wherein the data newly acquired consists of diagnostic information and process data of the manufacturing equipment other than the target manufacturing equipment which is connected to said group controller.

9. The group controller claimed in claim 5, wherein data is newly acquired from the manufacturing execution system.

10. The group controller claimed in claim 9, wherein data newly acquired from the manufacturing execution system consists of maintenance history performed in an off-line status of the manufacturing equipment.

11. The group controller claimed in claim 5, wherein data newly acquired consists of data deriving from a separate device, said data being collected in the manufacturing execution system.

* * * * *